United States Patent [19]
Lapierre

[11] Patent Number: 5,794,998
[45] Date of Patent: Aug. 18, 1998

[54] CARRYING AND HANDLING TOOL FOR CONSTRUCTION BOARDS

[76] Inventor: Clément Lapierre, 432, 2e Rue Saint-Hélène-de-Bagot, Québec, Canada, J0H 1M0

[21] Appl. No.: 926,061

[22] Filed: Sep. 9, 1997

[51] Int. Cl.[6] .................. B65G 7/12; B66F 11/00
[52] U.S. Cl. .................. 294/15; 294/26; 294/169
[58] Field of Search .................. 294/15, 19.1, 26, 294/27.1, 32, 137, 169; 254/131

[56] References Cited

U.S. PATENT DOCUMENTS

| | | | |
|---|---|---|---|
| D. 288,276 | 2/1987 | Harney | D8/14 |
| D. 289,367 | 4/1987 | Secor | D8/71 |
| D. 290,926 | 7/1987 | Embra | D8/14 |
| D. 349,437 | 8/1994 | Mock et al. | D8/14 |
| 488,357 | 12/1892 | Hill | 294/15 X |
| 2,262,918 | 11/1941 | Brown | 294/15 X |
| 2,428,941 | 10/1947 | Packard | 294/15 X |
| 4,013,202 | 3/1977 | Russo . | |
| 4,098,442 | 7/1978 | Moore . | |
| 4,190,278 | 2/1980 | Jancik, Jr. | 294/26 |
| 4,695,085 | 9/1987 | Cassels | 294/15 |
| 5,069,495 | 12/1991 | Mears | 294/15 |
| 5,127,693 | 7/1992 | Pruit | 294/15 |
| 5,257,843 | 11/1993 | Nunn | 294/15 |

FOREIGN PATENT DOCUMENTS 1024926  1/1978  Canada .

OTHER PUBLICATIONS

David B. Bernstein, Avoiding the Pitfalls in Licensing Patented Technology: A Case Study, Mar. 1996, pp. 82–83 and 85, 86, 87 in Plastics Engineering.
©1993 Stanley Tools, Div. Of The Stanley Works, New Britain, CT 06050, U.S.A., Stanley Panel ©Carry 93–301.

*Primary Examiner*—Johnny D. Cherry
*Attorney, Agent, or Firm*—Dick and Harris

[57] ABSTRACT

The tool is for carrying and handling construction boards. The tool has an elongated member having a lower end to which a board support element is rotatably attached to rotate about a rotation axis projecting perpendicularly from the front face of the elongated member. The board support element has a flat support surface projecting perpendicularly with respect to the front face of the elongated member, to receive an edge of a construction board. A spring mechanism is provided for rotatably biasing the board support element about the rotation axis towards a central angular position where the support surface is perpendicular to a main axis of the elongated member. A handle is attached to the elongated member at an upper location thereof with respect to the board support element. The handle has a handgrip portion extending offset from the rear face of the elongated member.

20 Claims, 5 Drawing Sheets

CARRYING AND HANDLING TOOL FOR CONSTRUCTION BOARDS

FIELD OF THE INVENTION

This invention relates to a carrying and handling tool for construction boards, sheets, panels and the like, which is versatile and can be used for manual carrying of boards on building sites as well as for manipulation of boards in a manufacturing plant.

BACKGROUND

Many have proposed tools and implements for carrying boards, yet most have not succeeded past a mere carrying tool embodiment.

Carrying a board between two locations remains a carrying activity. Picking up a board lying flat on a workbench, getting it down, taking it to a board shelf and placing it there are handling operations. The ease with which these activities are achieved depends on the quality of the tool used. Another activity, namely engaging in a 40° sloped staircase and climbing it with a 48" by 96" board, remains a daily feat in many building trades. With the conventional tools, this operation requires acrobatic gymnastic from the worker. All in all, the good old traditional method is best in these circumstances, i.e. two workers hand-carrying the boards by their extremities.

Only one tool seems to have reached the market place, namely the PanelCarry (TM) from Stanley Tools (R) company. This tool is made of an L-shaped integral plastic piece that can be used for board carrying purposes. However, its short non-adjustable length forces the worker to crouch to insert the tool under a standard dimension board. This operation requires the worker to lift the board at least 1 ¾ inches from the ground while maintaining the board in equilibrium with one hand and sliding the tool with the other, all this in crouched position. Furthermore, the design of the tool causes joint injuries to the average worker since the board normally rubs against his hand during carriage. Gloves can be worn by the worker, but this may be impractical in some plants.

Known in the art are U.S. Pat. Nos. 4,013,202 (Russo), 4,098,442 (Moore), 4,190,278 (Jancik, Jr.), 4,695,085 (Cassels), 5,127,693 (Pruit), 5,069,495 (Mears), U.S. design Pat. Nos. 288,276 (Harney), 289,367 (Secor), 290,926 (Embra), 349,437 (Mock et al.), and Canadian patent No. 1,024,926 (Miller et al.), which disclose various types of article carriers. However, none of the above-mentioned documents provides a really practical, easy to use and versatile carrying and handling tool for construction boards, sheets, panels and the like. In some cases, the supporting element is too large, cumbersome, cutting, or scratching. Some are provided with handles so badly designed that the hand of the worker used to lift the tool may be squeezed between the handle and the boards during their carriage. Some have irregular bearing surfaces that may damage the boards and/or imbalance the tool when in use. Some have pivoting members, but the upper locations of the pivots produce very inconvenient balancing and torque effects, in which cases the boards are likely to disengage from the tool.

SUMMARY

An object of the present invention is to provide a really practical, easy to use and versatile carrying and handling tool for construction boards, sheets, panels and the like.

The carrying and handling tool according to the present invention comprises:

an elongated member having a main axis, upper and lower ends, and opposite front and rear faces;

a board support element rotatably attached to the lower end of the elongated member to rotate about a rotation axis projecting substantially perpendicularly from the front face of the elongated member, the board support element having a substantially flat support surface projecting perpendicularly with respect to the front face of the elongated member, to receive an edge of a construction board;

spring means for rotatably biasing the board support element about the rotation axis towards a central angular position where the support surface is perpendicular to the main axis of the elongated member; and a handle attached to the elongated member at an upper location thereof with respect to the board support element, the handle having a handgrip portion extending offset from the rear face of the elongated member.

Preferably, the handle is slidingly mounted onto the elongated member to slide along the main axis thereof, and can be locked at the desired position.

Preferably, the front face of the elongated member is straight and flat to reduce as much as possible the risks of damaging the boards and that the boards tilt on the tool.

The positioning of the board support element at the lower end of the elongated member, combined with the spring mechanism biasing the support surface towards the central angular position provides the tool with unmatched usability and stability, especially in staircase locations. The rotation of the board support element follows the swaying of the boards carried by the tool while the spring mechanism particularly assists in preventing disengagement of the boards as it causes the board support element to exert constantly a pressure on their bottom edges.

BRIEF DESCRIPTION OF THE DRAWINGS

A detailed description of preferred embodiments of the invention will be given herein below with reference to the following drawings, in which like numbers refer to like elements.

DETAILED DESCRIPTION OF PREFERRED EMBODIMENTS

Figure 1:
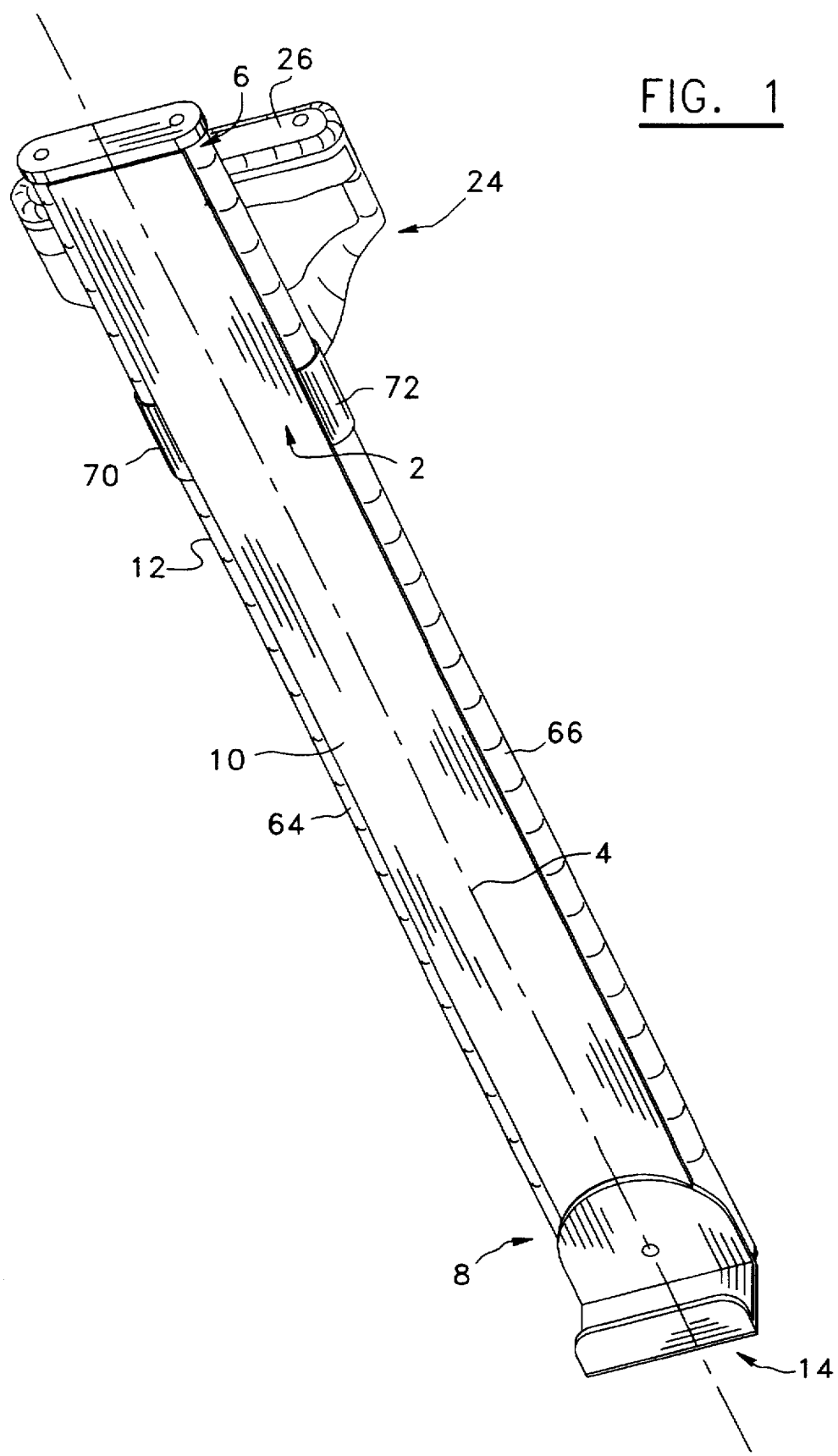
FIG. 1 is a perspective view of the tool according to the invention.

Referring to FIG. 1, there is shown an embodiment of the carrying and handling tool according to the present invention. The tool comprises an elongated member 2 provided with a board support element 14 and a handle 24. The elongated member 2 has a main axis 4 (shown in dotted lines), upper and lower ends 6, 8, and opposite front and rear faces 10, 12.

Figure 4:
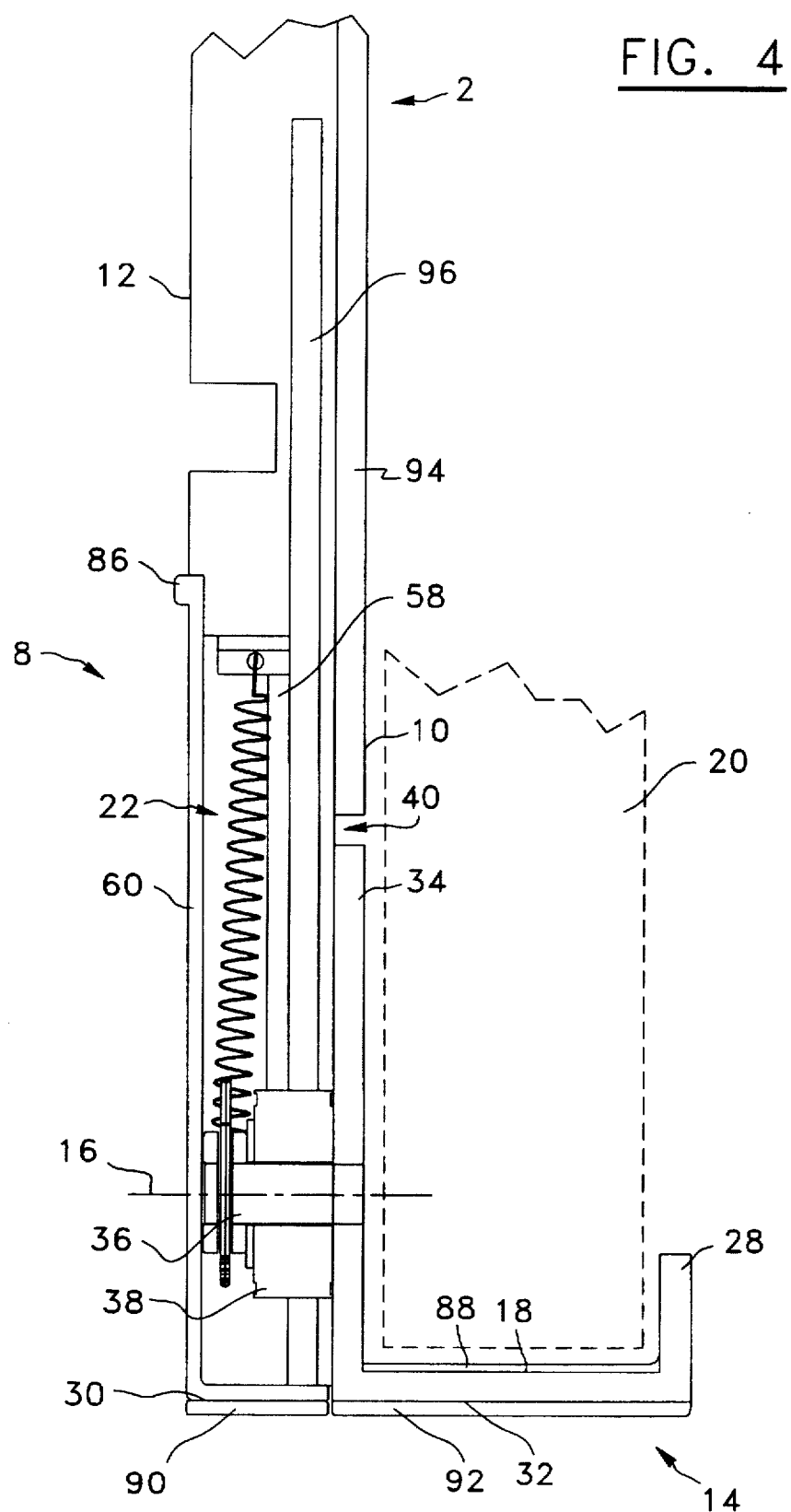
FIG. 4 is an enlarged cross section view of the lower portion of the tool.

Referring to FIG. 4, the board support element 14 is rotatably attached to the lower end 8 of the elongated member 2 to rotate about a rotation axis 16 projecting substantially perpendicularly from the front face 10 of the elongated member 2. The board support element 14 has a substantially flat support surface 18 projecting perpendicularly with respect to the front face 10 of the elongated member 2, to receive an edge of a construction board 20.

Figure 3:
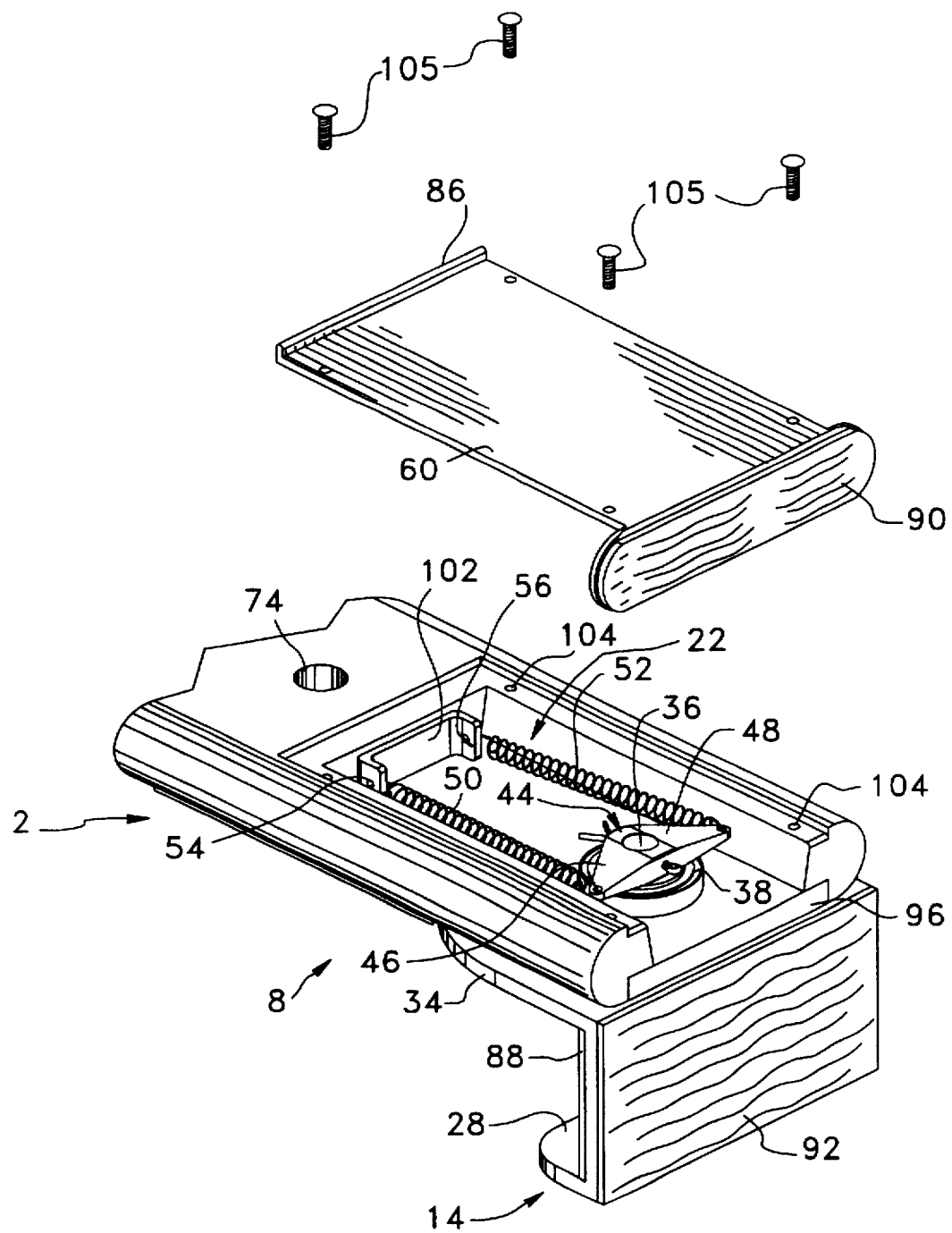
FIG. 3 is a enlarged perspective view of the lower portion of the tool with the cover removed, showing the balancing spring mechanism.

Referring to FIG. 3, a spring mechanism 22 is provided for rotatably biasing the board support element 14 about the rotation axis 16 towards a central angular position where the support surface 18 is perpendicular to the main axis 4 of the elongated member 2, as shown in FIG. 1.

Figure 2:
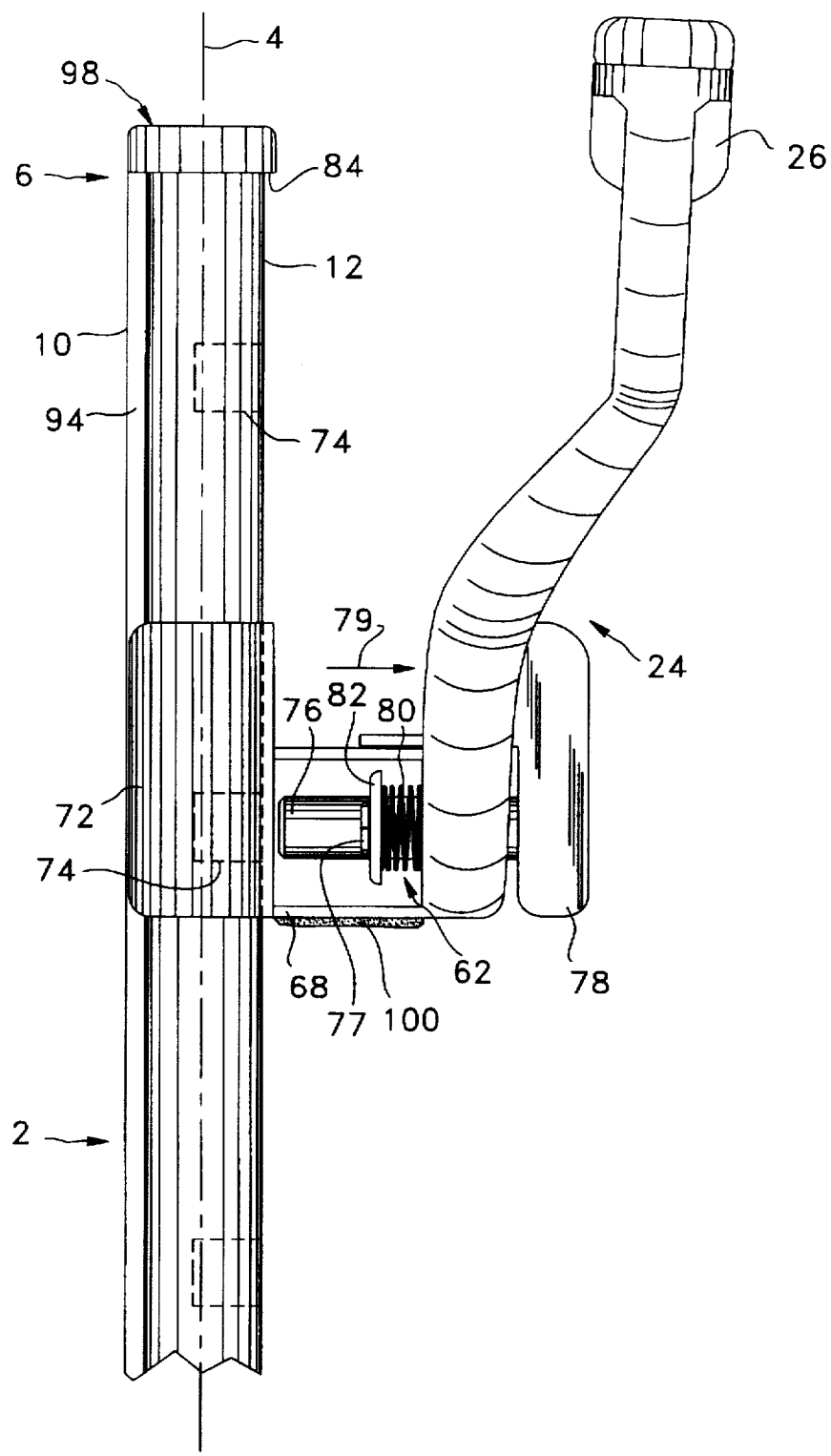
FIG. 2 is an enlarged side elevation view of the tool handle.

Referring to FIG. 2, the handle 24 is attached to the elongated member 2 at an upper location thereof with respect to the board support element 14. The handle 24 has a handgrip portion 26 extending offset from the rear face 12 of the elongated member 2, to leave sufficient space for the hand of a worker. In this configuration, the side of the board carried by the tool rests against the front face 10 of the elongated member, so the hand of a worker is safely protected behind the elongated member 2.

The handle 24 is slidingly mounted onto the elongated member 2 to slide along the main axis 4 thereof. A locking mechanism 62 is provided for locking the handle 24 in a fixed position along the elongated member 2.

Referring to FIGS. 1 and 2, the elongated member 2 has opposite rounded side faces 64, 66. The handle 24 is provided with a guide member 68 having spaced apart curved side guides 70, 72 extending on both sides of the rounded side faces 64, 66, respectively, to slideably guide the handle 24 along the elongated member 2. The locking mechanism 62 consists of a series of regularly spaced apart holes 74 formed in the rear face 12 of the elongated member 2, along the main axis 4 thereof. A pin 76 is operatively mounted onto the handle 24 so that the pin 76 is removably engageable by means of an axial movement into the holes 74. The pin 76 has a distal end provided with a tab 78 to pull out the pin 76 from the holes 74 using a simple finger pulling pressure in the direction of the arrow 79. Indeed, the user can easily pull the pin 76 out of the hole 74 with the tab 78 using a single finger while using his same hand to slide the handle 24 up or down on the member 2. His other hand remains free to do other things. A spring 80 is mounted onto the handle 24, around the pin 76 and between the guide member 68 and a spring bearing ring 82, for biasing the pin 76 towards the holes 74. The spring bearing ring 82 can be conveniently secured to the pin 76 by means of a cotter pin 77 to facilitate the assembly of the locking mechanism 62. The guide member 68 can be provided with a rubber pad 100 on its bottom surface thereby becoming usable for pushing boards in handling operations.

The handgrip portion 26 extends substantially in parallel to the rear face 12 of the elongated member 2 and crosswise with respect to the main axis 4 thereof. The handle 24 may exhibit any other suitable shapes, and may be fixedly secured onto the elongated member 2 instead of being adjustable.

Referring to FIGS. 2 and 4, the elongated member 2 is provided with stoppers 84, 86 at the upper and lower ends 6, 8 for restricting the handle 24 within a predetermined displacement range along the elongated member 2. The stopper 84 is provided by an outward projection of a cap 98 covering the upper end 6 of the elongated member 2. The stopper 86 is provided by a lip rearwardly projecting from the upper edge of the cover 60. Preferably, the holes 74 are arranged in such a way that the pin 76 engages in the uppermost or lowermost one when the handle 24 abuts either one of the stoppers 84, 86.

Referring to FIG. 4, the board support element 14 may be provided with a retaining flange 28 upwardly projecting from the support surface 18, the flange 28 being spaced apart from the elongated member 2 to leave space for the edge of the construction board 20. The space preferably corresponds to a thickness of a number of side by side construction boards like the board 20. Thus, the boards have little play to slide fore and aft in the board support element 14, thereby reducing the risk of disengagement while improving the steadiness of the board support by the tool. The support surface 18 has a width substantially corresponding to a width of the elongated member 2. The support surface 18 can be slightly downwardly inclined towards the elongated member 2 to direct the boards against the front face 10 thereof while urging the board to remain in place on the support surface 18.

The lower end 8 of the elongated member 2 and the board support element 14 have substantially flat undersides 30, 32 flush with each other when the board support element 14 is in the central angular position.

The board support element 14 is provided with a pivot bearing flange 34 upwardly projecting from the support surface 18, the pivot bearing flange being adjacent to the front face 10 of the board support member 2. The pivot bearing flange 34 is provided with a pivot 36 outwardly projecting from the support element 14. The pivot 36 can be welded to the pivot bearing flange 34, and preferably should not protrude on the side where the boards are carried. The lower end 8 of the elongated member 2 comprises a bearing 38 in the front face 10, to journal the pivot 36, thereby rotatably mounting the board support element 14 onto the elongated member 2. The bearing can be enclosed in a metallic casing. The above arrangement is well adapted to render the board support element 14 replaceable.

Figure 5:
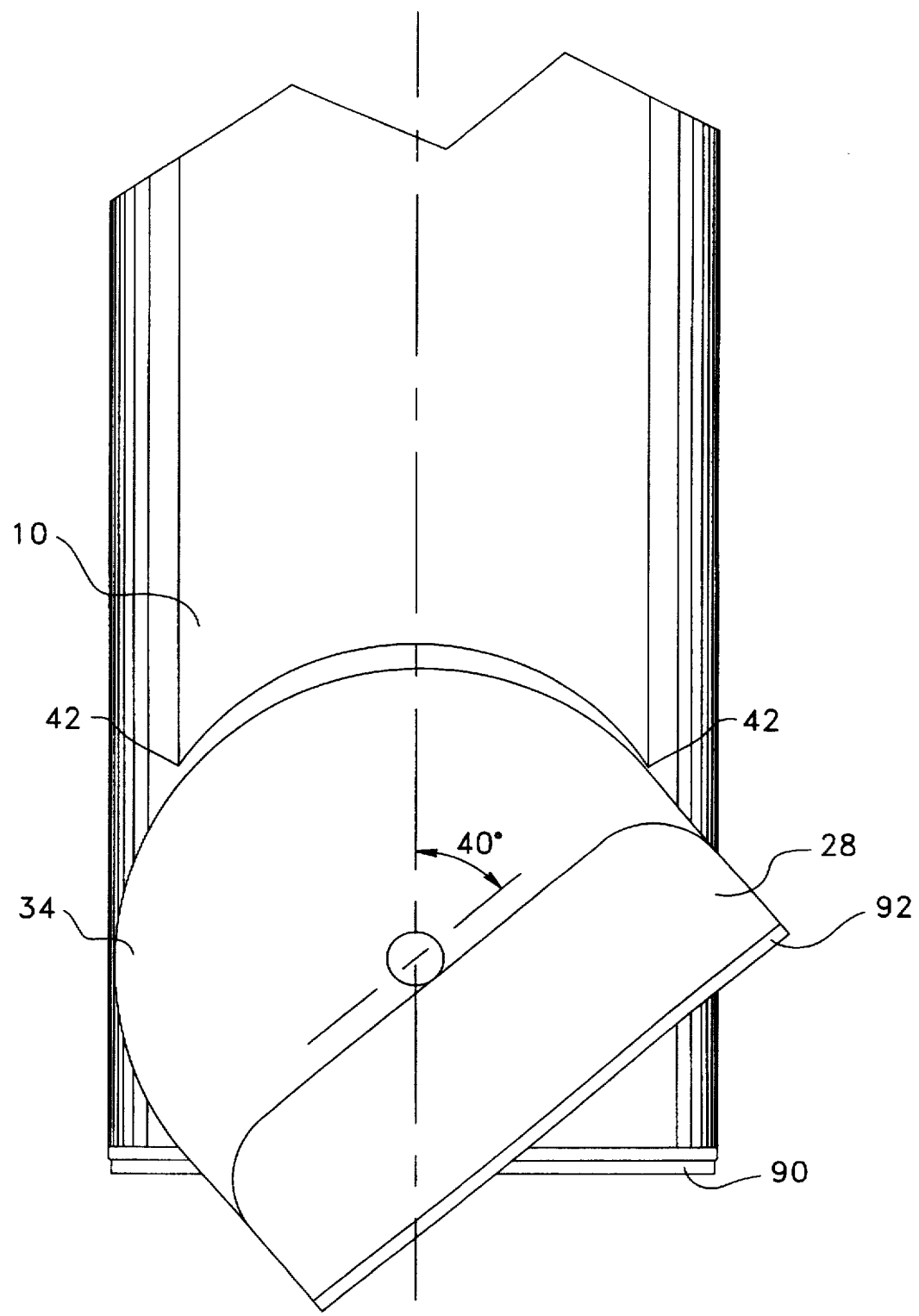
FIG. 5 is an enlarged front elevation view of the lower portion of the tool, showing the board support element in a limit angular position.

Referring to FIG. 5, the front face 10 of the elongated member 2 is straight and flat, and has a recess 40 receiving the pivot bearing flange 34 in a flush arrangement with the front face 10 of the elongated member 2.

The pivot bearing flange 34 has an semicircular upper portion and a substantially rectangular lower portion. The recess 40 has a partially semicircular upper shape complementary to the upper portion of the pivot bearing flange 34. The upper shape provides opposite end surfaces 42 in the front face 10 of the elongated member 2 that form stops for the rectangular lower portion of the pivot bearing flange 34, thereby preventing the pivot bearing flange 34 to rotate past a predetermined limit angular position with respect to the central angular position. Preferably, this limit angular position is around ±40° with respect to the central angular position, which represents a maximum angle range beyond which board disengagement is likely to occur.

Referring to FIG. 3, the spring mechanism 22 comprises a balancing lever 44 extending transversely with respect to the pivot 36, behind the front face 10 of the elongated member 2. The balancing lever 44 has a center solid with the pivot 36, and a pair of opposite ends 46, 48 on both sides of the pivot 36. A pair of springs 50, 52 have first ends attached to respective ones of the ends 46, 48 of the balancing lever 44, and opposite ends attached to respective attachment points 54, 56 on the elongated member 2 to cause the springs 50, 52 to operate in opposition with each other upon the balancing lever 44, thereby biasing the balancing lever 44 into an equilibrium state where the board support element 14 is in the central angular position. The attachment points 54, 56 can be formed in a plate 102 secured inside the elongated member 2. The continuous pressure exerted by the board support element 14 on the supported board(s) during handling in a staircase or elsewhere contributes to prevent lateral disengagement of the supported board(s) by sliding at the slightest release or aftershock from the worker. In the above configuration, the springs 50, 52 operate in tension. It should be understood that the spring mechanism can take numerous other forms, as long as it produces the above-described effect upon the board support element 14. For example, springs operating in compression, in torsion, etc. could be used for this purpose.

Referring to FIG. 4, the lower end 8 of the elongated member 2 has a hollow 58 behind the front face 10 to enclose the spring mechanism 22. The lower end 8 of the elongated member 2 has an opening on the hollow 58, the opening extending in the underside 30 and the rear side 12 of the elongated member 2. The elongated member 2 is provided with a cover 60 slidingly engageable into the opening to cover it, the cover 60 being shaped for flush mounting with the rear face 12 and the underside 30 of the elongated member 2. The elongated member can be provided with threaded holes 104 as shown in FIG. 3, to receive screws 105 for securing the cover 60 to the elongated member 2.

The support surface 18 is provided with an anti-skid pad 88. The undersides 30, 32 of the elongated member 2 and the board support element 14 are provided with cushion pads 90, 92.

The elongated member 2 may be cast in plastic and may comprise a reinforcement metal strip 96 extending in the lower end of the elongated member 2. Other materials can be used in the construction of the tool, e.g. wood, aluminum, etc.

Referring to FIG. 2, the front face 10 of the elongated member has a forwardly projecting portion 94 flush with foremost edges of the side guides 70, 72. Thus, the tool exhibits a lateral bearing surface devoid of any irregular projections that could damage the side of the board carried by the tool.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A carrying and handling tool for construction boards, comprising:
   an elongated member having a main axis, upper and lower ends, and opposite front and rear faces;
   a board support element rotatably attached to the lower end of the elongated member to rotate about a rotation axis projecting substantially perpendicularly from the front face of the elongated member, the board support element having a substantially flat support surface projecting perpendicularly with respect to the front face of the elongated member, to receive an edge of a construction board;
   spring means for rotatably biasing the board support element about the rotation axis towards a central angular position where the support surface is perpendicular to the main axis of the elongated member; and
   a handle attached to the elongated member at an upper location thereof with respect to the board support element, the handle having a handgrip portion extending offset from the rear face of the elongated member.

2. A carrying and handling tool according to claim 1, wherein the board support element comprises a retaining flange upwardly projecting from the support surface, the flange being spaced apart from the elongated member to leave space for said edge of the construction board.

3. A carrying and handling tool according to claim 2, wherein the space corresponds to a thickness of a number of side by side construction boards.

4. A carrying and handling tool according to claim 1, wherein:
   the lower end of the elongated member has a substantially flat underside; and
   the board support element comprises a substantially flat underside flush with the underside of the lower end of the elongated member when the board support element is in said central angular position.

5. A carrying and handling tool according to claim 4, wherein the undersides of the elongated member and the board support element are provided with cushion pads.

6. A carrying and handling tool according to claim 1, wherein:
   the board support element comprises a pivot bearing flange upwardly projecting from the support surface, the pivot bearing flange being adjacent to the front face of elongated member, the pivot bearing flange being provided with a pivot outwardly projecting from the support element; and
   the lower end of the elongated member comprises a bearing in the front face, to journal the pivot.

7. A carrying and handling tool according to claim 6, wherein the front face of the elongated member comprises a recess receiving the pivot bearing flange in a flush arrangement with the front face of the elongated member.

8. A carrying and handling tool according to claim 7, wherein:
   the pivot bearing flange has a semicircular upper portion and a substantially rectangular lower portion; and
   the recess has a partially semicircular upper shape complementary to the upper portion of the pivot bearing flange, the upper shape providing opposite end surfaces in the front face of the elongated member that form stops for the rectangular lower portion of the pivot bearing flange, thereby preventing the pivot bearing flange to rotate past a predetermined limit angular position with respect to the central angular position.

9. A carrying and handling tool according to claim 8, wherein the limit angular position is around ±40° with respect to the central angular position.

10. A carrying and handling tool according to claim 6, wherein the spring means comprises:
    a balancing lever extending transversely with respect to the pivot, behind the front face of the elongated member, the balancing lever having a center solid with the pivot, and a pair of opposite ends on both sides of the pivot; and
    a pair of springs having first ends attached to respective ones of the ends of the balancing lever, and opposite ends attached to respective attachment points on the elongated member to cause the springs to operate in opposition with each other upon the balancing lever, thereby biasing the balancing lever into an equilibrium state where the board support element is in said central angular position.

11. A carrying and handling tool according to claim 6, wherein:
    the elongated member has an underside;

the lower end of the elongated member comprises a hollow behind the front face to enclose the spring means;

the lower end of the elongated member has an opening on the hollow, the opening extending in the underside and the rear side of the elongated member; and the elongated member comprises a cover slidingly engageable into the opening to cover the opening, the cover being shaped for flush mounting with the rear face and the underside of the elongated member.

12. A carrying and handling tool according to claim 1, wherein the handle is slidingly mounted onto the elongated member to slide along the main axis thereof, the carrying and handling tool further comprising locking means for locking the handle in a fixed position along the elongated member.

13. A carrying and handling tool according to claim 12 wherein:

the elongated member has opposite rounded side faces;

the handle is provided with a guide member having spaced apart curved side guides extending on both sides of the rounded side faces, respectively, to slideably guide the handle along the elongated member; and the locking means comprises:

a series of spaced apart holes formed in the rear face of the elongated member, along the main axis thereof;

a pin movably mounted onto the handle so that the pin is removably engageable into the holes, the pin having a distal end provided with a tab to pull out the pin from the holes using a finger pressure; and spring means mounted onto the handle, for biasing the pin towards the holes.

14. A carrying and handling tool according to claim 13, wherein the front face of the elongated member has a forwardly projecting portion flush with foremost edges of the side guides.

15. A carrying and handling tool according to claim 12, wherein the elongated member comprises stop means at the upper and lower ends for restricting the handle within a predetermined displacement range along the elongated member.

16. A carrying and handling tool according to claim 1, wherein the handgrip portion extends substantially in parallel to the rear face of the elongated member and crosswise with respect to the main axis thereof.

17. A carrying and handling tool according to claim 1, wherein the support surface is provided with an anti-skid pad.

18. A carrying and handling tool according to claim 1, wherein the elongated member is plastic and comprises a reinforcement metal strip extending in the lower end of the elongated member.

19. A carrying and handling tool according to claim 1, wherein the front face of the elongated member is straight and flat.

20. A carrying and handling tool according to claim 1, wherein the support surface has a width substantially corresponding to a width of the elongated member.

* * * * *